Patented Sept. 24, 1946

2,408,066

UNITED STATES PATENT OFFICE 2,408,066

P-AMINO-BENZENE-SULPHAMIDE DERIVATIVES

Winfrid Hentrich, Rodleben, near Dessau-Rosslau, Anhalt, and Erik Schirm, Dessau, Anhalt, Germany; vested in the Alien Property Custodian No Drawing. Application June 3, 1939, Serial No. 277,300. In Germany May 5, 1938

6 Claims. (Cl. 260—397.7)

It has been found that technically valuable p-amino-benzol-sulphimides of the general formula

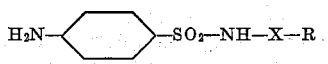

are obtainable in causing the reaction of benzol-sulpho-halogenides, which in p-position contain a substituent transformable into an amino group, upon alkali-compounds of acid-amides of the general formula R—X—NH$_2$, or alkali-compounds of benzol-sulphamides, which in p-position contain a substituent transformable into an amino group, upon acid-halogenides of the general formula R—X—Hal, and in forming then in the condensation-product the free amino group in a way known in itself.

In the aforementioned general formulas R means any acyclic or cyclic hydrocarbon residue which may also contain hetero-atoms or heteroatom groups such as oxygen, sulphur, nitrogen, halogen, hydroxyl-, sulpho-, ether-, amino-, substituted amino groups such as acylamino-, nitro-, azo-, azoxy-, ester-, acid-amide groups and the like; X means the groups SO$_2$ or CO, and Hal means a halogen-atom and particularly a chloroatom. By the groups which according to well known methods are easily converted into an amino group and which, in the benzol-sulphohalogenides or benzol-sulphamides respectively, ought to be arranged in p-position to the sulpho-group, we mean acyl-amine groups, the nitro-group, the azo-group, the azoxy-group and the like.

As to the acid-amides of the general formula R—X—NH$_2$ or, respectively, acid-halogenides of the general formula R—X—Hal there are to be considered for the present method e. g. the amides or halogenides respectively of the following acids: acetic acid, butyric acid, lauric acid, stearic acid, methane-, ethane-, ethylene-, dodecane, hexadecane-, sulpho-acid, further the benzoic acid, its homologues and substitution-products, the phenyl-acetic acid, the phenoxy-acetic acid, the naphthoic acid, the picolic and nicotinic acid, the benzol-sulpho-acid, its homologues and substitution products such as 2,5-dichloro-aniline-4-sulpho-acid, the benzyl-sulpho-acid, the naphthaline-sulpho-acids etc.

The mixing of those acid-amides or -halogenides respectively with the p-substituted benzol-sulpho-chlorides or -amides respectively is performed to well known methods either directly or in the presence of an indifferent diluent such as benzol, toluol, xylol, chloro-benzol, tetra-chloro-hydrocarbon or the like. The subsequent conversion of the groups contained in the molecule, which allow of being conveyed into amino-groups, is also performed to methods known in themselves. The nitro-, azo- or azoxy-group respectively is converted into an amino-group by reduction, and the acyl-amino-group by saponification.

The sulphimides obtainable according to the present method are excelling by the fact that with alkalis, ammonia and numerous organic bases they give water-soluble salts, the solutions of which react neutrally, which is of great importance for their being applied—particularly in the pharmaceutical domain—as remedies against strepto- and staphylo-bacteria infections. It is true that similarly constituted sulphimides could already be produced, whereat the amino-group of the amino-benzol-sulpho-residue was, however, not arranged in para-, but in meta-position. Those compounds are of quite a different character and they did not prove efficient as medical remedies and particularly not against strepto- and staphylo-bacteria infections.

Example 1

200 weight parts of p-nitrobenzol-sulphochloride are dissolved in 1000 volume-parts of toluol. Into this solution 193 weight-parts of p-toluol-sulphamide-sodium are brought in the form of a fine powder. Then the mixture is heated at the reflux-cooler while stirring, until the toluol begins to boil and at this temperature the mixture is kept for about 5 hours under permanent stirring. After cooling down the separated reaction-product is filtered off, then washed with a little amount of alcohol and dissolved in a solution of 150 weight-parts of calcinated soda in 2500 weight-parts of water while warming. The hot solution is cleared by filtration and the filtrate is cooled in ice. After a several hours' standing the sodium salt of the di-sulphimide abundantly precipitating in the form of small crystal flakes turning into a thickish crystal-mass, is sharply sucked off or pressed off, then covered with some ice-water and finally dried in the warmth. We thus obtain 262 weight-parts (=77% of the theory) of p-nitro-p'-methyl-dibenzol-sulphimide-sodium. In working-up the mother-lye further amounts of the condensation-product may be gained.

262 weight-parts of this nitro-compound are stirred, within half an hour at 60 to 65° C., into a solution of 183 weight-parts of crystallized sodium-sulphide (Na$_2$S.9H$_2$O) and 25 weight-parts of sulphur in 1000 weight-parts of water.

Then we stir for a further half an hour at 65°, whereupon we warm up to 80° in keeping this temperature for one hour. When the reaction is finished an exceeding of sodium-sulphide will still be traceable. The thus obtained solution is then cooled in ice. After a rather long standing in the cold the meanwhile developed crystal mass is filtered off. From the filtrate a further amount of reduction-product is separating after an addition of common salt.

For purification the united precipitates are re-crystallized from a little amount of water, whereat the eventual yellow aspect can be eliminated by an addition of a little amount of sodium hydrosulphite. The portions left dissolved are precipitated from the mother-lye by common salt. Now the precipitates are dissolved in much water whereupon we acidify with muriatic acid and filter off the white precipitate, which we subsequently dissolve and precipitate from a large amount of boiling water. After drying the substance obtained forms a white micro-crystalline powder with a flash-point of 231 to 232° C. (non-corrected), which in a sodium-solution, while forming a neutrally reacting sodium salt of the formula

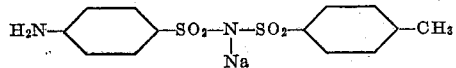

is soluble. In the same way salts with organic bases are soluble e. g. salts with tri-ethanolamine.

Example 2

236 weight-parts of the sodium salt of the p-acetamino-benzene-sulphamide are suspended in 1000 volume-parts of xylol; then 133 weight-parts of benzoyl-chloride are added, whereupon the mixture is heated up at the reflux-cooler for 3 to 4 hours until the xylol begins to boil. The mixture is filtered after being cooled down, the residue is washed with a little amount of alcohol and taken in a warm exceeding 5%-sodium carbonate solution. The filtered solution is then boiled until the acetyl group is split off. By acidifying with muriatic acid the obtained N-(p'-amino-benzene-sulphonyl-)benzamide is precipitated out, filtered in the cold and purified by dissolving and precipitating from diluted alcohol.

Example 3

236 weight-parts of the sodium salt of the p-acetyl-amino-benzene-sulphamide are suspended in 150 volume-parts of toluene. To the suspension 128 weight-parts of ethyl sulphonic acid chloride are added while stirring and the mixture is heated under reflux for 5 hours. The reaction mixture is cooled down and filtered, the residue is washed and dissolved in warm 5% soda lye. The solution is boiled until the acetyl group is split off. After working up in the manner as in Example 2 the p-amino-benzene-(ethyl)-sulphimid of the formula $$NH_2.C_6H_4.SO_2.NH.SO_2.C_2H_5$$

is obtained.

The sulphonamide derivatives obtained by the prescribed processes having an alkyl sulphon residue in the molecule such as p-amino-benzene-methyl-sulphimid, p-amino-benzene-ethyl-sulphimid, p-amino-benzene-propyl-sulphimid, p-amino-benzene-butyl-sulphimid and the like are especially valuable as they have a very good compatibility with the body.

We claim:

1. Compounds having the general formula

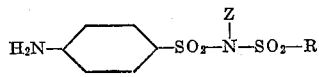

wherein R is an aliphatic radical and Z is selected from the group consisting of hydrogen and alkalis, ammonia, and organic basic forming salts in combination with the rest of the molecule.

2. An alkali metal salt of an $N^1$-alkylsulphonyl sulphanilamide.

3. An $N^1$-alkylsulphonyl sulphanilamide.

4. An $N^1$-butylsulphonyl sulphanilamide.

5. An $N^1$-octylsulphonyl sulphanilamide.

6. An $N^1$-methylsulphonyl sulphanilamide.

WINFRID HENTRICH.
ERIK SCHIRM.